Sept. 24, 1968

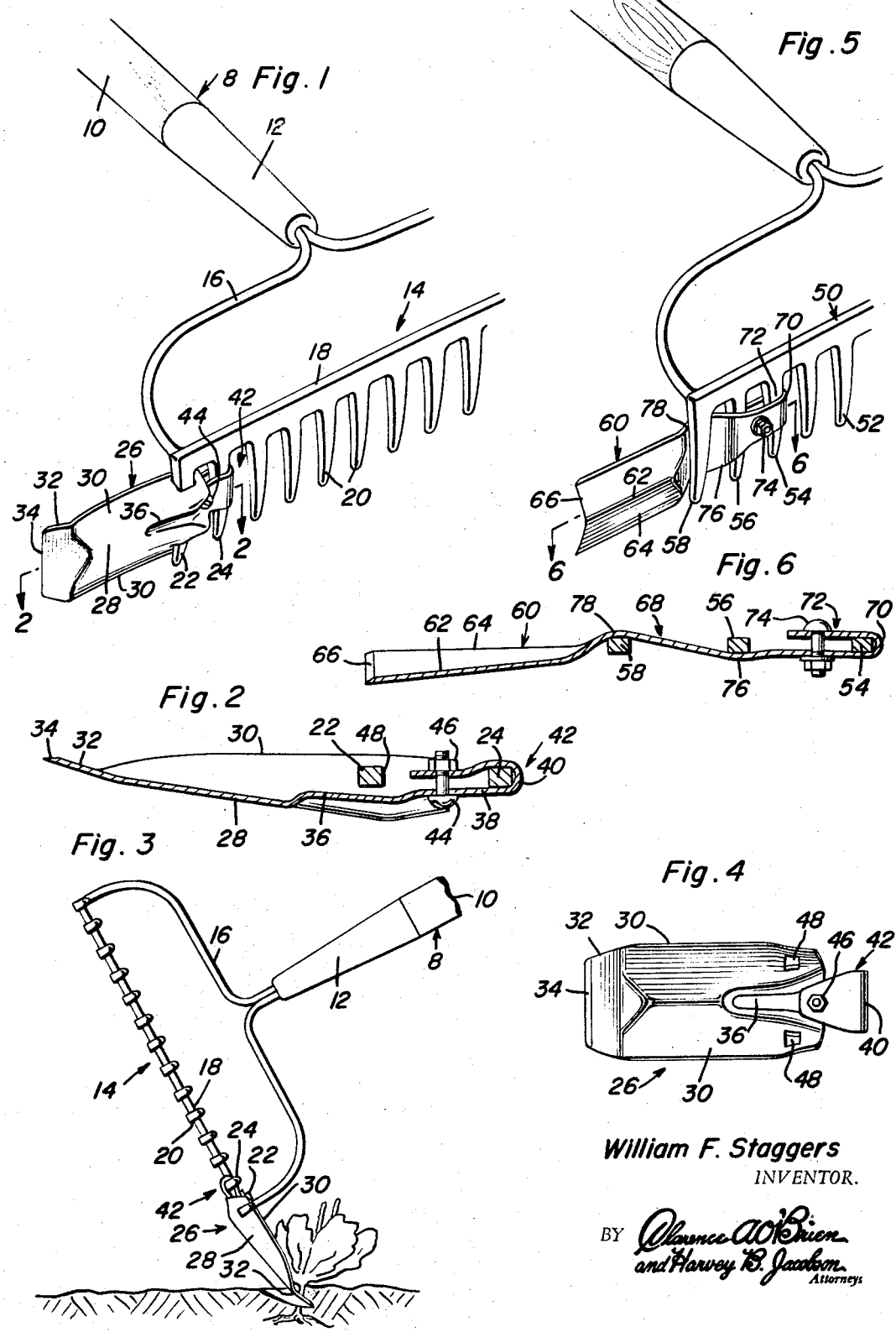

W. F. STAGGERS 3,402,543

RAKE ATTACHMENT

Filed April 9, 1965

William F. Staggers
INVENTOR.

BY *Clarence A. O'Brien*
and *Harvey B. Jackson*
Attorneys

United States Patent Office 3,402,543
Patented Sept. 24, 1968

3,402,543
RAKE ATTACHMENT
William F. Staggers, % Leo C. Saxe, R.F.D. 1, Box 1566, Mitchellville, Md. 21109
Filed Apr. 9, 1965, Ser. No. 446,940
2 Claims. (Cl. 56—400.05)

ABSTRACT OF THE DISCLOSURE

The inventive concept has to do with an attachment which, specifically speaking, comprises four embodiments. Generically the invention enables the user to dig out weeds and then rake them up. A one-piece body is provided with a sharpened hoe-like weeder. The inner end is reduced in cross-section and provides an attaching and retaining shank. The shank is constructed in similar but varying ways to facilitate attaching the same to two or more prongs of the head of the rake.

---

This invention relates to a rake attachment which is structurally adapted to be quickly and easily attached to one end of the rake and employed in conjunction with the rake when a user desires to weed, rake and clean a yard or other similar area requiring attention.

Without this attachment, as will be hereinafter more fully appreciated, it is generally necessary for the user to hunt for and then resort to the use of individual yard and garden tools which, of course, takes up valuable time and necessitates switching from one tool to another, often without satisfactory results. On the other hand and regardless of where one has need for a rake, the herein disclosed attachment not only assists the user, it serves the many purposes for which it is well adapted and intended.

Further, the attachment is so constructed and cooperatively oriented with the regularly used rake that it does not interfere with or otherwise encumber or prevent customary use of the rake for normal every-day gardening and similar work requirements. As a matter of fact, the attachment cooperates with the head and teeth of the rake so effectively that there is no need to remove the attachment after it has been properly attached. Accordingly, it can, and should be, kept in place and thus readied for use the year round.

A rake equipped with the attachment permits the user to dig out weeds and then rake them up. It is readily and easily attached to one end of the rake. With certain variations it slides on at least two teeth with an end portion abutting a third tooth. One form of the invention utilizes a simple and practical stove bolt and nut to secure it in a reliable stay-put position. Other forms of the attachment slip on the first two teeth and have a brace extending over to a third tooth for stability and firm support. The rake teeth, tapered as usual, permit this form to be easily tapped into place and frictionally held on the supporting teeth.

The attachment, as experimental usage has shown is simple, practical, highly useful and efficient, saves time, money and a workingman's patience and, what is important, obviates the need for separate weeding and digging tools normally required to remove weeds from the yard and garden, a gravesite in a graveyard or similar plot. The fact is, a rake equipped with the invention herein disclosed is adequate and very well serves the work-day year-round needs of (1) the caretakers of cemetery graves as well as (2) home and garden owners, or other users in areas where rakes, weeders and the like tools are regularly needed and used.

More specifically, the attachment is characterized by an elongated outstanding rigid body or blade portion terminating in a cutting edge at one end and provided at its other end with attaching and retaining means and which actually makes the attachment a compatible part of the rake when it is clampingly or otherwise applied thereto. The rake with the weeder attached lends itself to time and labor saving use, for example when working the soil in and around growing tomatoes, cabbage, lettuce, beets, around the roots of certain plants and flowers and enables the user to chop, dig up and otherwise dispose of objectionable weeds (plantain and the like).

The preceding general description pertains to the broad or over-all inventive ideas. It should be noted, however, that some four forms or embodiments of the attachment type weeder are disclosed herein. Briefly, one embodiment pertains to a rigid elongated blade or body having a laterally bent outer cutting edge, the inner opposite end being formed with an extension which in turn is fashioned into a loop which can be clamped on a selected prong or tooth of the rake. The attachable portion of the body or blade is provided with aligned openings or holes through and beyond which a terminal or end prong of the rake head passes, whereby to thus provide a sturdy and reliable connection between the attachment and rake head.

In a second form of the invention the inner attachable end is provided with a similarly formed loop which embraces at least one prong or tooth and is secured by a stove bolt, the adjacent portion having suitable offset bends which are disposed in opposite directions and bridge, seat and are firmly based against coacting teeth to, in this manner, provide a firm and reliable mounting for the attachment.

Other forms of this invention are along the line briefly referred to above but do not depend on the bolted loop. This is to say, the loop and stove bolt are omitted and an attaching and retaining shank is rigidified and provided with a pair of aligned holes for reception of the rake prongs. Accordingly, the thus constructed shank is lined up properly with, tapped into place and wedged on the two end prongs of the rake.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the attachment showing the same secured to two prongs at one end of a conventional rigid rake;

FIGURE 2 is an enlarged sectional view taken substantially along the longitudinal section line 2—2 of FIGURE 1;

FIGURE 3 is an elevational view of a rake having the tool or attachment of FIGURES 1 and 2 attached thereto and showing the attachment being used in a digging and weeding operation;

FIGURE 4 is a plan view of the rake attachment by itself;

FIGURE 5 is a perspective view of a second embodiment of the present invention showing a different form of rake attachment secured to the prongs of a regular or conventional-type rake;

FIGURE 6 is an enlarged view in section taken substantially along section line 6—6 of FIGURE 5;

Figure 7:
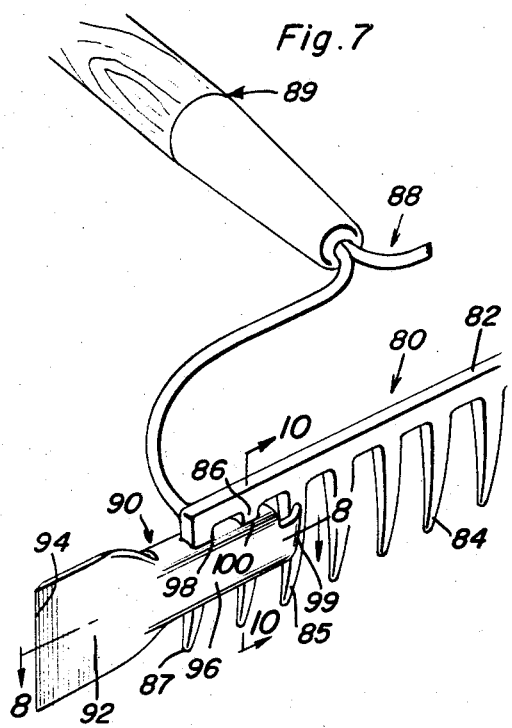
FIGURE 7 is a view in perspective similar to the modifications shown in FIGURES 1 and 5 but which represents a third form or modification of the invention and shows how it is constructed and applied.

Referring first to the form of the invention shown in FIGURES 1 to 4 inclusive it will be seen that FIGURES 1 to 3, the combination, the rake and attachment appears while the attachment by itself is illustrated in FIGURE 4. The rake is denoted generally by the numeral 8 and is of conventional construction and includes a handle 10, a ferrule 12, a head 14 and a yoke or equivalent means 16 connecting the head with the handle. The head is also of conventional form in that it includes a rigid elongated back or bar 18 provided along one edge with regulation or common prongs or teeth 20. For sake of emphasis the endmost tooth is denoted at 22 and the tooth adjacent or proximal thereto is denoted at 24. It is these two teeth or prongs with which the weeder attachment is detachably connected. Obviously, the attachment can be used (not shown) at both ends of the rake. However, it is though advisable to simplify the disclosure by merely showing and speaking of a single weeder attachment. It follows that the attachment, denoted as a unit by the numeral 26, is elongated and of a width less than the length of the teeth or prongs of the rake. It is dished or trough-like in cross-section and the central or body portion is channel-like as at 28 and toed-in to provide curved flanges 30. The outer or tip portion is laterally deflected as at 32 and beveled and sharpened at 34 to provide a digging, chopping and weeding blade. The over-all member or "body" is also referred to as a blade. The central attachable end portion can be indented to provide a reinforcing rib at 36. This end portion is reduced in width and provides a tang or tongue (FIGURE 2) 38 which, in turn, is bent upon itself at 40 and thus fashioned into a loop-like clamp 42. This clamp removably embraces the tooth 24. The free end portion is secured by bolt and nut means (a simple stove bolt) 44 and 46 to the tooth 24. The flanges 30 are provided with a pair of square suitably aligned openings or holes 48 through which the end prong or tooth 22 extends. Thus, rigid attaching means is provided for the over-all attachment. The attachment is applied in the manner shown in FIGURES 1 and 2, is of the construction shown by itself in FIGURE 4 and can be used, for example, for digging, weeding and other everyday raking purposes. The teeth of the rake are sufficiently long that the attachment can be allowed to remain in place and hence both the rake and attachment can be used either singly or collectively as the work at hand requires.

The same concept is disclosed, generally speaking, in FIGURES 5 and 6. In FIGURE 5 for example the rake head is differentiated by the numeral 50 and has regular teeth 52 and here three end teeth or prongs 54, 56 and 58 are involved. In this form of the invention the elongated plate provides a body and blade portion denoted at 60 having a central dished or trough portion 62 and edge flanges 64, the left hand or free end being beveled and fastened into a cutting edge 66. Here the shank 68 is significantly longer and the inner or right hand portion is bent upon itself as at 70 and forms a loop-like clamp 72 held in place by a bolt and nut 74, the clamp embracing the single tooth 54. This clamp is much the same as the clamp 42. It is different however in that the median part of the shank has a lateral bend or offset at 76 and another one at 78. The bent portion 70 is clamped to the tooth 54 and the part adjacent thereto passes between the two teeth 56 and 58 and the next or second bend or bent portion 78 is offset sufficiently to bridge and rigidify itself against the tooth or prong 58. Consequently, a novel and secure mode of mounting and clamping the attachment is achieved in this special adaptation and arrangement.

Figure 8:
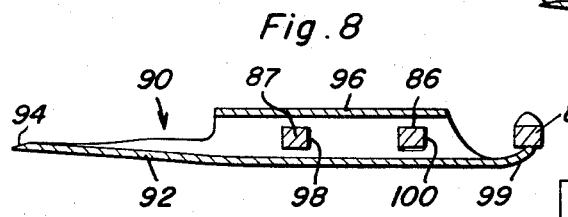
FIGURE 8 is an enlarged sectional view taken approximately on the plane of the section line 8—8 of FIGURE 7.

Taking up now the form or embodiment of the invention (the third form) shown in FIGURES 7 to 10 inclusive it will be seen that the head of the rake is denoted by the numeral 80, the same comprising the customary rigid back 82 with teeth or prongs 84. The several end prongs which are involved in this form of the invention are differentiated from the main prongs 84 and from each other by the numerals 85, 86 and 87. The yoke of the rake is denoted at 88 and the handle 89. The readily applicable and removable one-piece sheet metal or equivalent attachment is here denoted by the numeral 90 and it comprises a flat plate or blade portion 92 having its terminal edge sharpened as at 94 to define a cutting edge. The right hand end portion of the blade is formed into an elongated generally tubular or hollow part which is described here as a shank 96. The shank is provided at its inward or right-hand end with a curved or bent stabilizing tongue or tang 98 which when the attachment is in position provides a brace stabilizer and bears against the surface of the tooth 85 as shown in FIGURES 7 and 8 in particular. The tubular shank is provided at longitudinally spaced points with upper and lower aligned non-circular holes or openings; that is, two openings 98 at the left through which the tapered prong 87 is passed and similar but suitably positioned non-circular openings or holes 100 which accommodate the prong or tooth 86. It follows that the prongs 86 and 87 extend through the holes in the manner illustrated and permit the shank to be applied and tapped with a hammer or other implement readily into position. The size and shape of the holes and prongs is such that once the prongs are jammed or pushed through the openings, the shank is held by friction and stays put.

Figure 11:
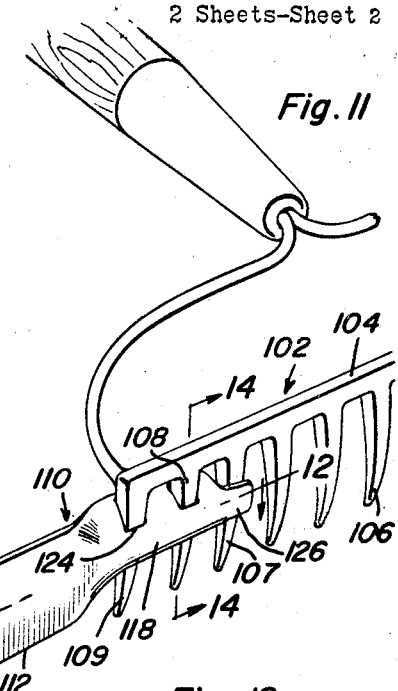
FIGURE 11 is a view similar to FIGURE 7 also in perspective and showing the fourth form or modification of the attachment and how it is constructed and used.
Figure 12:
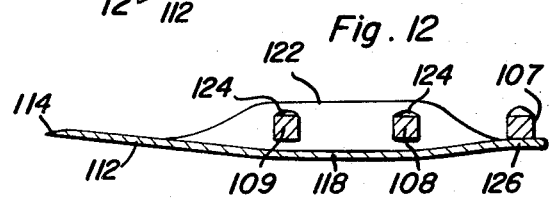
FIGURE 12 is an enlarged horizontal section taken on the plane of the section line 12—12 of FIGURE 11.
Figure 9:
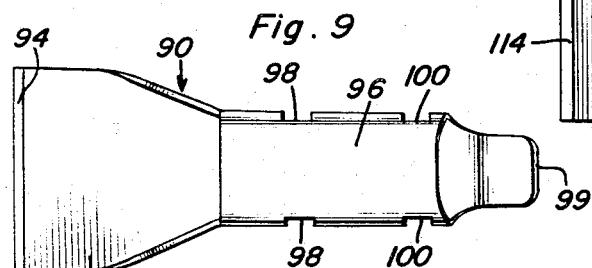
FIGURE 9 is a view on a scale like that of FIGURE 8 but showing the attachment removed from the rake.
Figure 13:
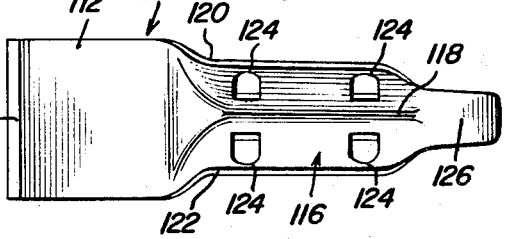
FIGURE 13 is an enlarged elevational view of the attachment by itself.
Figures 10, 14:
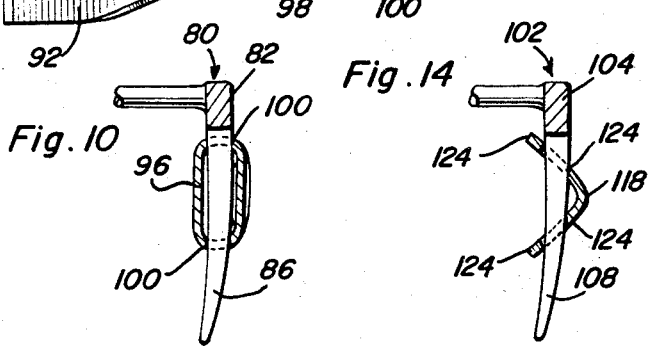
FIGURE 10 is a sectional view taken on the plane of the section line 10—10 of FIGURE 7.
FIGURE 14 is a view similar to FIGURE 10 but taken on the plane of the section line 14—14 of FIGURE 11.

The fourth form or embodiment of the invention is similar to that already described but is nevertheless slightly and specifically different. Shown in FIGURE 11 the rake head is denoted by the numeral 102, the back of the rake being denoted at 104 and the regular teeth at 106. The three end teeth are denoted at 107, 108 and 109 respectively. The attachment in this case is denoted by the numeral 110 and it is of one-piece rigid sheet metal form and comprises a flat blade or plate portion 112 having a tapered cutting edge 114. Here instead of having a tubular attaching shank the shank portion is of V-shaped form and is denoted by the numeral 116. As shown best in FIGURE 13 the ridge or rib portion of the shank is denoted at 118 and the outwardly flaring flanges are denoted at 120 and 122 respectively. These flanges are provided with a pair of non-circular holes or openings 124 through which the prong 109 extends as shown in FIGURES 11 and 12. Similar non-circular openings 124 are provided at the right to permit the passage therethrough of the prong 108. In this case the narrowed extension or tongue is denoted at 126 and is generally or substantially flat and rests against the surface of the prong 107 to provide the stabilizing result desired.

Regardless of whether the user has need for a rake as such, this attachment is so constructed and arranged that it will not counteract or disqualify the rake from its usual every day work capability and can and in fact should be left attached for use whenever necessary or desired. With the attachment applied the workman can dig out the weeds (see FIGURE 3), and then turn the rake properly and rake them up as suggested in FIGURES 1 and 2, for example. The attachment is very simply attached to the end of the rake with feasible variations—sliding on two teeth and engaging the third tooth. Another form simply calls for a stove bolt to secure it in a tight and stay put position and other forms slip on the first two teeth with the brace extending to the third tooth for retention and good support. The rake teeth being tapered enables this form to be tapped on very tightly but held by friction. The attachment is highly useful and will save time and money and overcome the need of extra and special tools that is normally takes to remove the weeds from the lawn, yard, garden or graveyard site.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment for several of the rigid end teeth of a rigid head in a garden rake comprising a rigid elongated plate fashioned into a weeder, the outer end of said weeder being provided with a cutting edge, the inner end having an elongated shank, said shank being V-shaped in cross-section and having a terminal narrowed tongue constituting a brace and adapted to bear upon a coacting tooth of said rake, the flanges of said shank being provided with holes and said holes serving to permit passage therethrough of adjacent teeth of said rake.

2. An attachment for at least several rigid end teeth of a common garden rake with a rigid head comprising a one-piece body provided at an outer end with a rigid elongated plate fashioned into a blade, said blade having an outer end provided with a digging and cutting edge and constituting a hoe-like weeder, the median and inner end portions of said body being reduced in cross-section and provided an attachment orienting, mounting and retaining shank, said shank being provided with upper and lower pairs of longitudinally spaced holes, the holes of the respective pairs being aligned and of a shape to receive and permit coacting teeth of the rake to pass therethrough with the teeth wedge-fitted and frictionally held in place in said holes, and the extreme inner end of said shank being further reduced in cross-section and providing a tongue, said tongue being adapted to engage and bind against a surface of a tooth which is adjacent thereto, whereby to provide a stabilizing brace.

References Cited

UNITED STATES PATENTS

| 923,629 | 6/1909 | Dalpay | 56—400.05 |
| 1,509,369 | 9/1924 | McKesson | 56—400.07 |
| 2,114,394 | 4/1938 | Lines | 56—400.06 |

FOREIGN PATENTS

| 652,940 | 5/1951 | Great Britain. |

ABRAHAM G. STONE, *Primary Examiner.*

P. A. RAZZANO, *Assistant Examiner.*